(12) United States Patent
Falck-Schmidt

(10) Patent No.: US 8,695,286 B2
(45) Date of Patent: Apr. 15, 2014

(54) TELESCOPIC MAST HAVING REDUCED PLAY

(75) Inventor: Jan Falck-Schmidt, Odense C (DK)

(73) Assignee: Falck Schmidt Defence Systems A/S, Odense C (DK)

( * ) Notice: Subject to any disclaimer, the term of this patent is extended or adjusted under 35 U.S.C. 154(b) by 493 days.

(21) Appl. No.: 12/439,862

(22) PCT Filed: Sep. 7, 2007

(86) PCT No.: PCT/DK2007/000401
§ 371 (c)(1),
(2), (4) Date: Mar. 4, 2009

(87) PCT Pub. No.: WO2008/028490
PCT Pub. Date: Mar. 13, 2008

(65) Prior Publication Data
US 2010/0050557 A1     Mar. 4, 2010

(30) Foreign Application Priority Data
Sep. 7, 2006  (DK) .................................. 2006 01150

(51) Int. Cl.
*E04H 12/34*     (2006.01)
(52) U.S. Cl.
USPC .................................. 52/118; 52/632; 52/114
(58) Field of Classification Search
CPC .................................................... E04H 12/182
USPC .................... 52/114, 118, 121, 632; 343/883; 212/350, 296
See application file for complete search history.

(56) References Cited

U.S. PATENT DOCUMENTS

| | | | | |
|---|---|---|---|---|
| 815,594 A | * | 3/1906 | Kovaoevic | 182/141 |
| 1,319,943 A | * | 10/1919 | Bessolo | 182/129 |
| 2,128,712 A | * | 8/1938 | Neff | 52/118 |
| 2,617,933 A | | 11/1952 | Noel | |
| 3,624,979 A | * | 12/1971 | Przydylski | 52/115 |
| 3,724,885 A | * | 4/1973 | Becker | 403/104 |
| 3,737,134 A | * | 6/1973 | Foon | 248/354.3 |
| 3,738,075 A | * | 6/1973 | Nansel | 52/115 |

(Continued)

FOREIGN PATENT DOCUMENTS

| | | |
|---|---|---|
| CA | 904530 A | 7/1972 |
| DE | 3611810 A1 * | 8/1986 |

(Continued)

OTHER PUBLICATIONS

International Search Report for International Application No. PCT/DK2007/000401.

*Primary Examiner* — Elizabeth A Plummer
(74) *Attorney, Agent, or Firm* — Roberts Mlotkowski Safran & Cole, P.C.; David S. Safran

(57) ABSTRACT

There is disclosed a telescopic mast (2) including two or more cylindric telescoping sections (4) with parallel walls (6), where the distal one of two adjacent telescoping sections (4) is narrower than the proximal one of the two adjacent telescoping sections (4), so that the distal telescoping section (4) can be moved into and out of the proximal telescoping section (4), respectively. In the interspace (8) between two adjacent telescoping sections (4) there is provided at least one device (10) interacting with an actuator (16) and pressing the adjacent walls (6) away from each other. Hereby play is eliminated or minimized.

4 Claims, 4 Drawing Sheets

(56) References Cited

U.S. PATENT DOCUMENTS

| | | | |
|---|---|---|---|
| 4,062,156 A | 12/1977 | Roth | |
| 4,137,535 A | 1/1979 | Rupprecht | |
| 4,151,534 A | 4/1979 | Bond | |
| 4,172,913 A * | 10/1979 | Ballah et al. | 428/9 |
| 4,513,938 A * | 4/1985 | Seymour | 248/507 |
| 4,793,197 A * | 12/1988 | Petrovsky | 74/89.35 |
| 5,035,094 A * | 7/1991 | Legare | 52/118 |
| 5,218,375 A | 6/1993 | Hillman | |
| 5,234,187 A * | 8/1993 | Teppo et al. | 248/161 |
| 5,279,084 A * | 1/1994 | Atsukawa | 52/118 |
| 5,333,422 A * | 8/1994 | Warren et al. | 52/115 |
| 5,492,430 A * | 2/1996 | Jones | 403/109.5 |
| 5,537,125 A * | 7/1996 | Harrell et al. | 343/878 |
| 5,660,495 A * | 8/1997 | Atsukawa | 403/377 |
| 6,152,638 A | 11/2000 | Lindsay | |
| 6,299,113 B1 * | 10/2001 | Yamashita et al. | 248/161 |
| 6,361,002 B1 * | 3/2002 | Cheng | 248/161 |
| 6,767,115 B2 * | 7/2004 | Blackwelder | 362/385 |
| 7,845,602 B1 * | 12/2010 | Young et al. | 248/125.8 |
| 8,092,121 B2 * | 1/2012 | Spearing et al. | 405/288 |
| 8,157,659 B2 * | 4/2012 | Kakutani et al. | 464/167 |
| 2004/0154237 A1 * | 8/2004 | Mainville | 52/118 |
| 2006/0039747 A1 * | 2/2006 | Shoda et al. | 403/109.1 |
| 2006/0207210 A1 * | 9/2006 | Kroeger | 52/721.5 |

FOREIGN PATENT DOCUMENTS

| | | |
|---|---|---|
| EP | 0 730 098 A1 | 9/1996 |
| GB | 2386579 A * | 9/2003 |
| WO | 01/89981 A1 | 11/2001 |

* cited by examiner

TELESCOPIC MAST HAVING REDUCED PLAY

FIELD OF THE INVENTION

The present invention concerns a telescopic mast including two or more cylindric telescoping sections with parallel walls, where the distal one of two adjacent telescoping sections is narrower than the proximal one of the two adjacent telescoping sections, so that the distal telescoping section can be moved into and out of the proximal telescoping section, respectively.

BACKGROUND OF THE INVENTION

There are many kinds of telescopic masts of which some can be extended automatically. In connection with telescoping masts, e.g. for military use, there are special requirements to stability and accuracy. U.S. Pat. No. 4,151,534 describes a free-standing mast for an antenna including a number of telescoping tubes. U.S. Pat. No. 4,137,535 describes a telescopic mast which is controlled pneumatically. The mast includes a number of telescoping tubes that may be collapsed in a base section. A piston is integrated in each section. WO 0189981 describes a telescoping member with a nut which is rotatably fastened to a frame, a rotary pipe with thread engaging the nut. None of these inventions are adequately fulfilling the requirements to stability and accuracy.

Telescopic masts can be very high and may be used for sensors and weapons as well as for pointing out targets. High telescopic masts contain many telescoping sections. As play occurs between all adjacent telescoping sections of the mast, the play will accumulate in connection with high masts. Therefore, not the least in connection with high telescopic masts, it will very appropriate to minimise the play occurring between adjacent telescoping sections.

OBJECT OF THE INVENTION

The object of the present invention is to provide a telescopic mast where the play between the telescoping sections is minimised. It is a further object of the invention to provide a telescopic mast that may be positioned with great accuracy.

DESCRIPTION OF THE INVENTION

According to the present invention, this is achieved with a telescopic mast including two or more cylindric telescoping sections with parallel walls, where the distal one of two adjacent telescoping sections is narrower than the proximal one of the two adjacent telescoping sections, so that the distal telescoping section can be moved into and out of the proximal telescoping section, respectively, where the telescopic mast is peculiar in that in the interspace between two adjacent telescoping sections there is provided at least one means that interacts with an actuator and presses the adjacent walls away from each other.

By a telescopic mast according to the invention is thus achieved a number of advantages, as the means pressing the adjacent walls away from each other minimises the play occurring between adjacent telescoping sections. By pressing the adjacent walls away from each other, the play is eliminated or minimised.

Means of different nature with regard to design as well as material may be used. It may be advantageous to make the means of materials that are dimensionally stable in connection with large temperature fluctuations. It may furthermore be advantageous to coat the means with a layer of friction reducing material, as e.g. Teflon, for minimising friction between and wear of the elements involved.

According to one embodiment, the telescopic mast according to the invention is peculiar in that the means is a rotary means interacting with an actuator which during use rotates the rotary means about an axis which is largely perpendicular to the longitudinal axis of the telescoping sections. Such an embodiment is advantageous as it enables using a rotary means which is elongated and has large contact surface, thereby enabling the provision of a continuous action on the walls in direction away from each other. It may be advantageous to use a rotary means which is slightly asymmetrical and/or in which the axis of rotation is displaced in relation to the central part of the means. Hereby is provided the possibility of positional variation of the areas on the means which are in contact with the walls. The rotary means may advantageously be covered by a friction reducing material, e.g. Teflon, in order to minimise friction and wear.

According to a second embodiment, the telescopic mast according to the invention is peculiar in that the means is a rotary member interacting with an actuator which during use rotates the rotary member about an axis which is largely parallel with the longitudinal axis of the telescoping sections. This embodiment also enables using a long rotary means having a large contact surface. A continuous action on the walls in direction away from each other may hereby be effected. It may be advantageous to use a rotary means which is slightly asymmetrical and/or in which the axis of rotation is displaced with regard to the central part of the means, as the possibility of varying the location of the areas on the means which are in contact with the walls is hereby provided. The rotary member may advantageously be covered by a friction reducing material, e.g. Teflon, in order to minimise friction between and wear of the members which are in mutual physical contact.

According to a third embodiment, the telescopic mast according to the invention is peculiar in that the means is a displacing means interacting with an actuator which during use displaces the displacing means in forward direction for pressing the walls away from each other. This embodiment enables using a play reducing member which does not have to be rotated. The displacing means may be designed as a cone or have other shapes. However, it is suitable to use a displacing means which is gradually tapered in forward direction, so that displacement in forward direction will gradually press the walls away from each other more and more. The displacing means may advantageously be covered by a friction reducing material, e.g. Teflon, in order to minimise friction between and wear of the members which are in mutual physical contact.

According to yet an embodiment, the telescopic mast according to the invention is peculiar in that there is used at least three rotary means and/or rotary members and/or displacing means. It will be suitable to distribute them with approximately the same mutual spacing so that adjacent telescoping sections are secured in a concentric position. Three rotary means and/or rotary members and/or displacing means are the lowest number that can ensure the securing of the adjacent telescoping sections in concentric position.

According to a further embodiment, the telescopic mast according to the invention is peculiar in that a pipe is provided within the telescoping sections. Such an embodiment will enable the carrying of power cables, liquid, gas or other matter through the pipes. Power cables will often be required to power central parts, such as actuators, or other equipment disposed along the telescoping sections or at the top of the mast.

It is possible to provide a telescopic mast in which a combination of a plurality of different means for pressing the walls away from each other is used.

The used actuators may e.g. be electric or pneumatic.

DESCRIPTION OF THE DRAWING

The invention will in the following be explained more closely with reference to the accompanying drawing, wherein.

DETAILED DESCRIPTION OF THE INVENTION

In the following description, identical or corresponding elements in the various embodiments will be provided with the same designations below.

Figure 1:
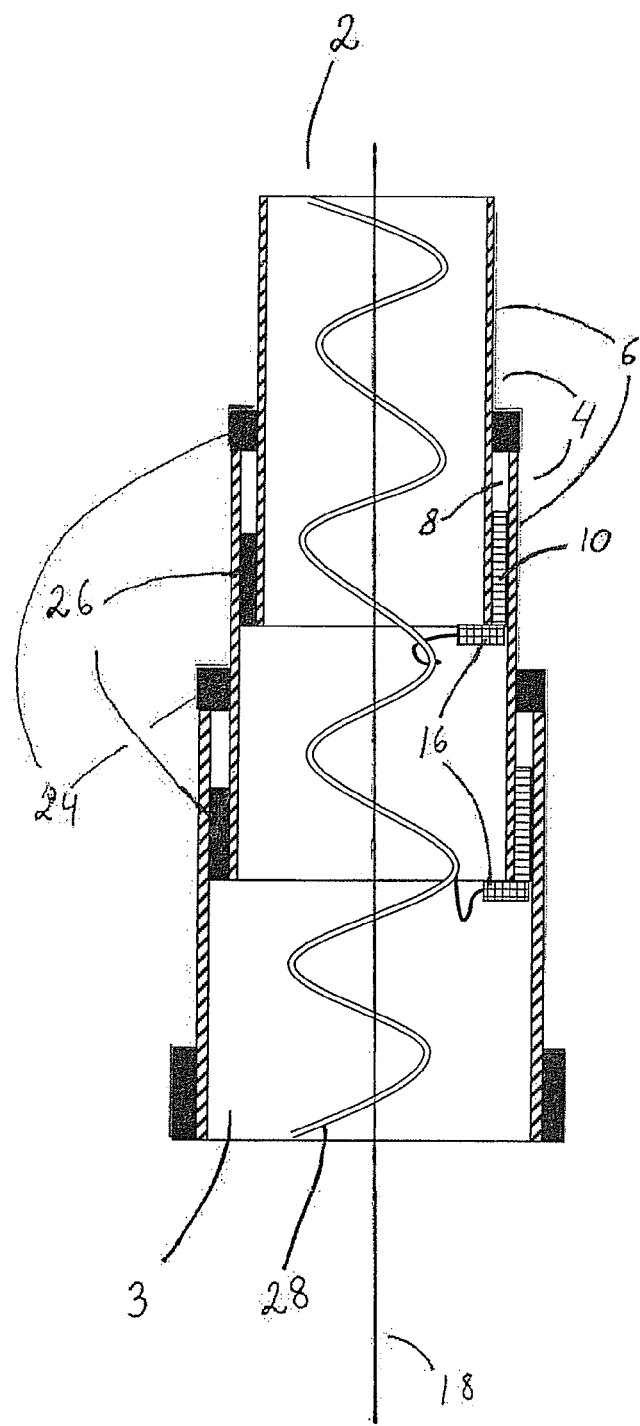
FIG. 1 shows a cross-sectional view (in longitudinal direction of the mast) of a first embodiment of a mast according to the invention, as seen from the front.

FIG. 1 shows a first embodiment of a mast 2 according to the invention. The mast 2 includes three cylindric telescoping sections 4 with walls 6. An outer guide 26 is provided at the outer sides of the walls, near the proximal end of each telescoping section 4. Also, an inner guide 24 is provided at the inner side of the walls 6 near the distal end of the walls. A means 10 interacting with an actuator 16 is provided in the interspace 8 between two adjacent telescoping sections 6. The actuator 16 is connected to a pipe 28 running through the inner cavity 3 of the telescoping sections. Electric power cables (not shown) run inside the pipe 28. The longitudinal axis 18 of the telescoping sections is indicated. During use, the means 10 presses the walls 6 away from each other, whereby the play is eliminated or minimised. Advantageously, there may be used three or more means 10 for pressing the walls 6 away from each other at several points. Adjacent telescoping sections are hereby secured in a concentric position. The guides 24, 26 ensure that adjacent telescoping sections are kept apart with a spacing allowing them to be moved into and out of each other.

Figure 2:
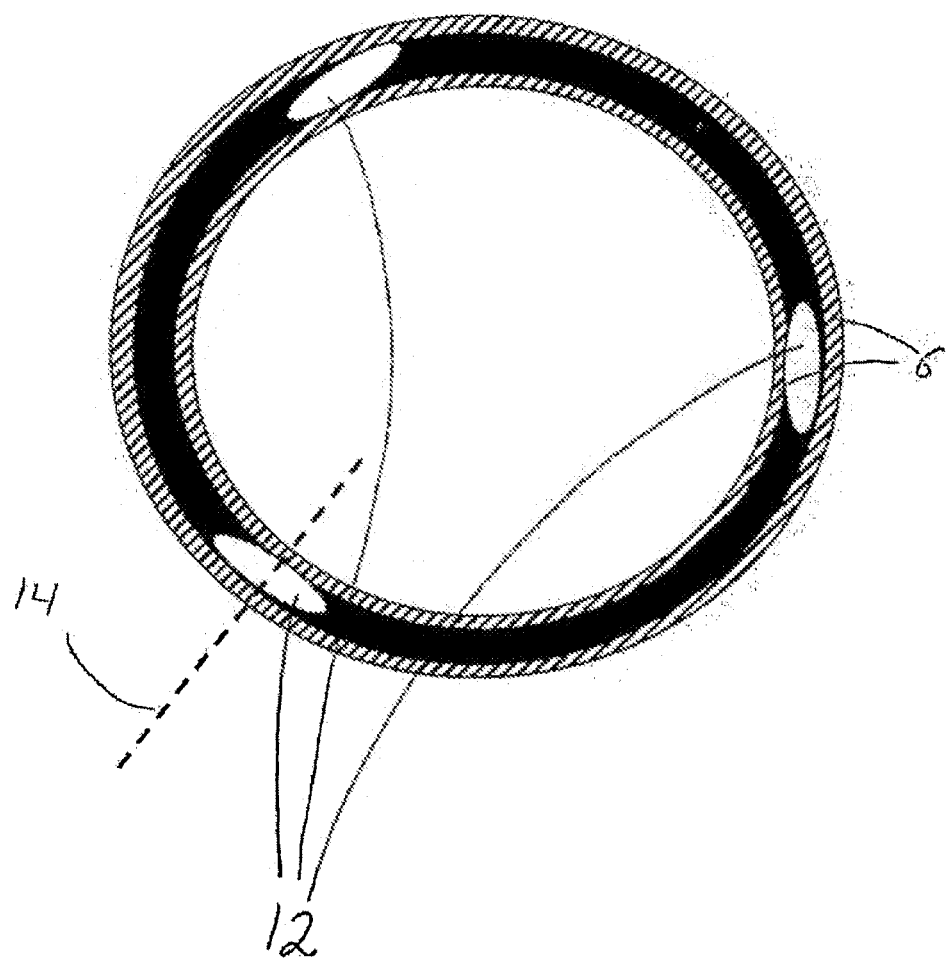
FIG. 2 shows a cross-sectional view (perpendicular to longitudinal direction of the mast) of a second embodiment of a mast according to the invention.

FIG. 2 shows a second embodiment of a mast 2 according to the invention. On the Figure appears two circular cylindric telescoping sections with walls 6, where in the space between the telescoping sections there are provided three rotary means 12 which can rotate about an axis 14 which is standing perpendicularly to the longitudinal axis (not shown) of the telescoping sections. During use, the rotary means 12 presses the walls 6 away from each other, whereby the play is eliminated or minimised. An actuator (not shown) is used for providing the rotational movement of the rotary means.

Figure 3:
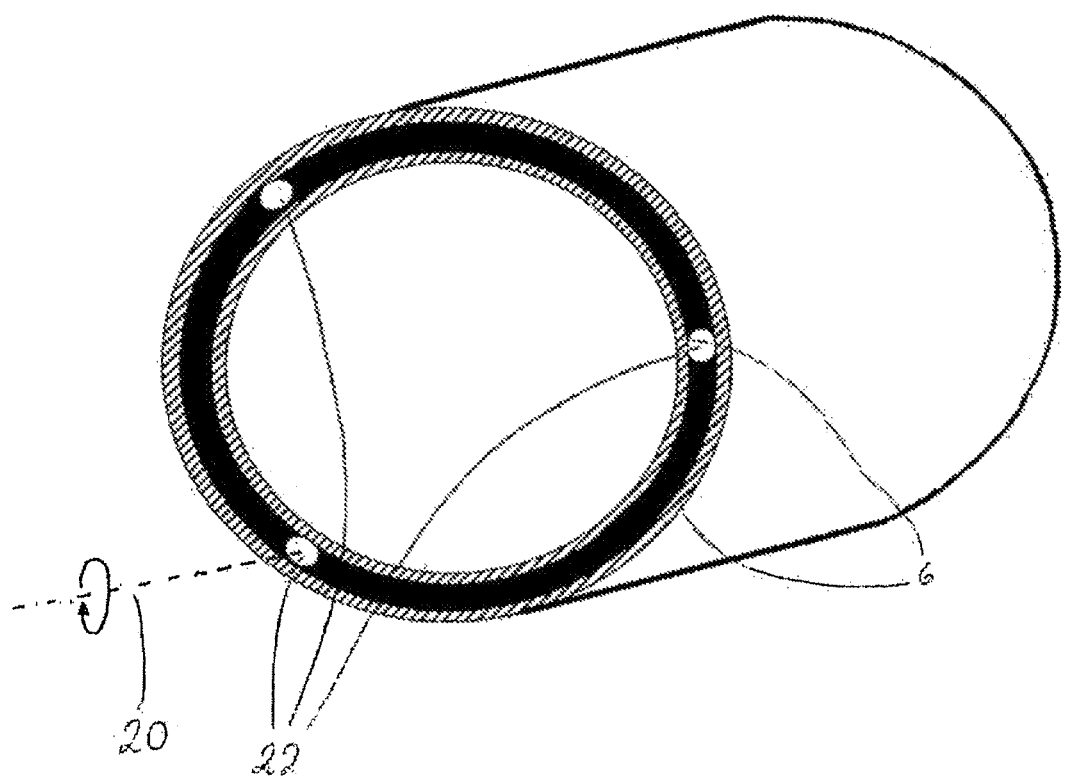
FIG. 3 shows a cross-sectional view (perpendicular to longitudinal direction of the mast) of a third embodiment of a mast according to the invention in perspective view.

FIG. 3 shows a third embodiment of a mast 2 according to the invention. On the Figure appears two circular, cylindric telescoping sections with walls 6, where in the space between the telescoping sections there are provided three rotary members 22 which can rotate about an axis 20 situated in parallel with the longitudinal axis of the telescoping sections. During use, the rotary members press the walls 6 away from each other, whereby the play is eliminated or minimised. An actuator (not shown) is used for providing the rotational movement of the rotary means.

Figure 4:
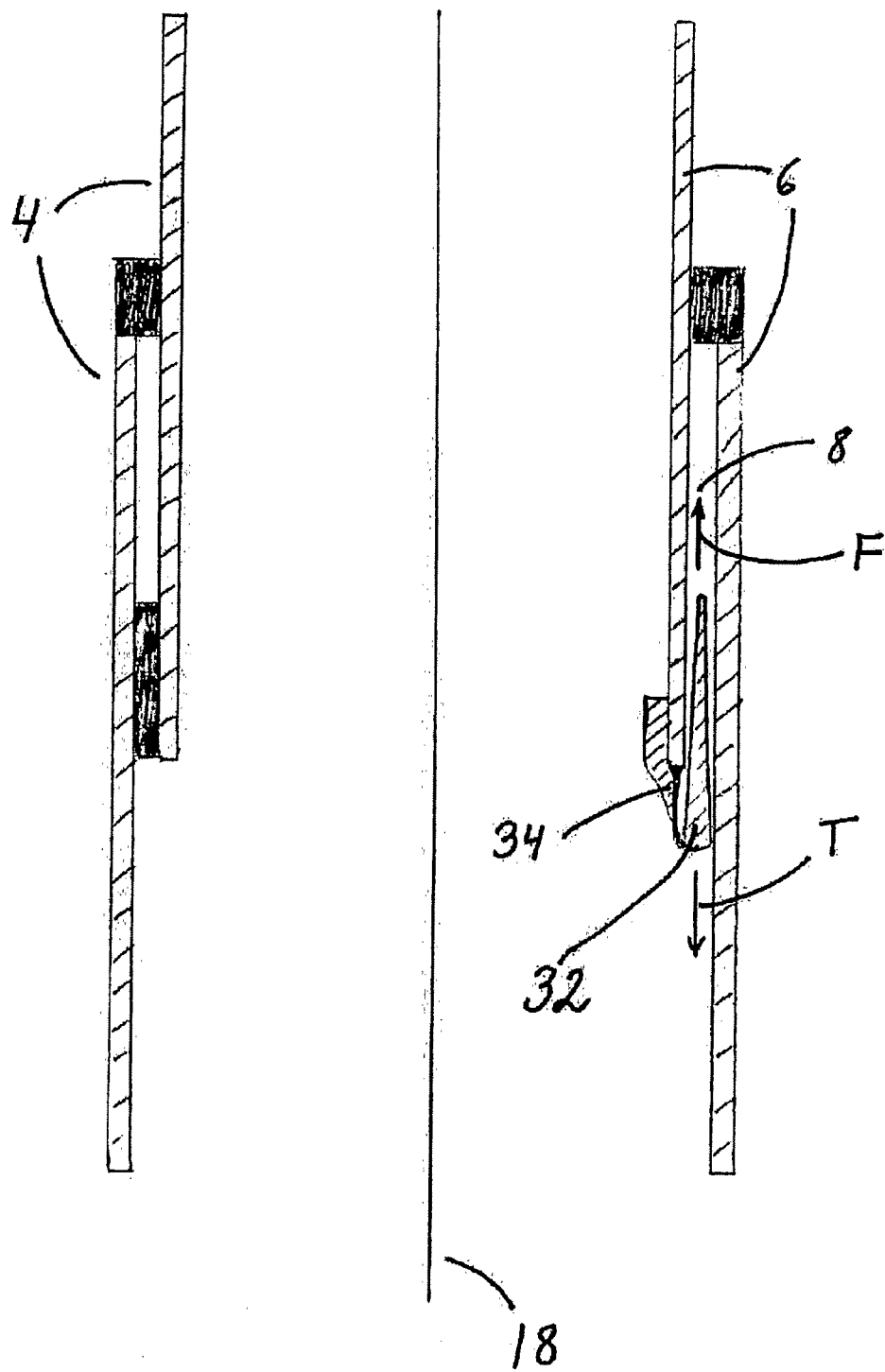
FIG. 4 shows a cross-sectional view (in longitudinal direction of the mast) of a fourth embodiment of a mast according to the invention, as seen from the front.

FIG. 4 shows a fourth embodiment of a mast 2 according to the invention. On the Figure appears two circular, cylindric telescoping sections 4 with walls 6, where in the space between the telescoping sections 8 there is provided a displacing means 32 which is connected to an actuator 34. The direction forward F and the direction back T are parallel with the longitudinal axis 18 of the telescoping sections. By means of the actuator 34, the displacing means 32 may be displaced in forward direction F and in backward direction T. By moving the displacing means 32 forward, the walls 6 are pressed away from each other. Hereby play is eliminated or minimised.

The invention claimed is:

1. A telescopic mast including two or more cylindric telescoping sections with parallel longitudinally extending walls, where a distal one of two adjacent telescoping sections is narrower than a proximal one of the two adjacent telescoping sections, so that the distal one of the two adjacent telescoping sections can be moved into and out of the proximal one of the two adjacent telescoping sections, respectively, wherein in the interspace between the two adjacent telescoping sections there is provided a plurality of means at circumferentially spaced locations, each of said plurality of means being in radial contact with both of the adjacent telescoping sections and being movable relative to both of the adjacent telescoping sections within the interspace by an electric or pneumatic actuator, said plurality of means having portions of different thicknesses for contacting both of the adjacent telescoping sections, movement of said plurality of means by said electric or pneumatic actuator changing the portions of said plurality of means that are in contact with said adjacent telescoping sections from portions of one thickness to portions of another thickness so as to variably adjust the degree to which the longitudinally extending walls are pressed away from each other in a direction perpendicular to the longitudinally extending walls by said plurality of means, thereby minimizing radial play between the adjacent telescoping sections;

wherein each of said plurality of means is a rotary member interacting with the electric or pneumatic actuator which during use rotates the rotary member about an axis which is generally parallel with a longitudinal axis of the two adjacent telescoping sections.

2. The telescopic mast according to claim 1, wherein said plurality of means comprises at least three means interacting with the electric or pneumatic actuator for pressing the longitudinally extending walls away from each other.

3. The telescopic mast according to claim 1, wherein a pipe is provided inside the telescoping sections.

4. A telescopic mast including two or more cylindric telescoping sections with parallel longitudinally extending walls, where a distal one of two adjacent telescoping sections is narrower than a proximal one of the two adjacent telescoping sections, so that the distal one of the two adjacent telescoping sections can be moved into and out of the proximal one of the two adjacent telescoping sections, respectively, wherein in the interspace between the two adjacent telescoping sections there is provided a plurality of means at circumferentially spaced locations, each of said plurality of means being in radial contact with both of the adjacent telescoping sections and being movable relative to both of the adjacent telescoping sections within the interspace by an electric or pneumatic actuator, said plurality of means having portions of different thicknesses for contacting both of the adjacent telescoping sections, movement of said plurality of means by said electric or pneumatic actuator changing the portions of said plurality of means that are in contact with said adjacent telescoping sections from portions of one thickness to portions of another thickness so as to variably adjust the degree to which the longitudinally extending walls are pressed away from each other in a direction perpendicular to the longitudinally extending walls by said plurality of means, thereby minimizing radial play between the adjacent telescoping sections;
    wherein said plurality of means comprises at least three means interacting with the electric or pneumatic actuator for pressing the longitudinally extending walls away from each other; and
    wherein each of the at least three means is a rotary member interacting with the electric or pneumatic actuator which during use rotates the rotary member about an axis which is generally parallel with a longitudinal axis of the two adjacent telescoping sections.

\* \* \* \* \*